US012804640B2

(12) United States Patent
Liu et al.

(10) Patent No.: US 12,804,640 B2
(45) Date of Patent: Nov. 17, 2026

(54) METHOD AND APPARATUS FOR TRIGGERING UPLINK DATA TRANSMISSION ENHANCEMENT PROCEDURE, AND TERMINAL

(71) Applicant: VIVO MOBILE COMMUNICATION CO., LTD., Dongguan (CN)

(72) Inventors: Jinhua Liu, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 493 days.

(21) Appl. No.: 18/220,326

(22) Filed: Jul. 11, 2023

(65) Prior Publication Data

US 2023/0354317 A1 Nov. 2, 2023

Related U.S. Application Data

(63) Continuation of application No. PCT/CN2022/071390, filed on Jan. 11, 2022.

(30) Foreign Application Priority Data

Jan. 12, 2021 (CN) ......................... 202110038590.7

(51) Int. Cl.
*H04W 72/1268* (2023.01)
*H04W 72/543* (2023.01)

(52) U.S. Cl.
CPC ..... *H04W 72/1268* (2013.01); *H04W 72/543* (2023.01)

(58) Field of Classification Search
CPC ......... H04W 72/0446; H04W 72/1268; H04W 72/21; H04W 72/543
See application file for complete search history.

(56) References Cited

U.S. PATENT DOCUMENTS

| | | | | |
|---|---|---|---|---|
| 2009/0219892 A1* | 9/2009 | Kim | .................... | H04W 36/324 370/332 |
| 2012/0117265 A1* | 5/2012 | Xu | ................... | H04N 21/44016 709/231 |
| 2021/0084534 A1* | 3/2021 | Kim | ........................ | H04L 69/04 |

FOREIGN PATENT DOCUMENTS

| | | |
|---|---|---|
| CN | 104185290 A | 12/2014 |
| CN | 105898797 A | 8/2016 |

(Continued)

OTHER PUBLICATIONS

International Search Report issued in corresponding International Application No. PCT/CN2022/071390, mailed Mar. 15, 2022, 4 pages.

(Continued)

*Primary Examiner* — Phuc H Tran
(74) *Attorney, Agent, or Firm* — IPX PLLC

(57) ABSTRACT

A method for triggering an uplink data transmission enhancement procedure and a terminal are provided. The method includes: generating, by an application layer of a terminal, original service data; estimating data transmission coordination control information corresponding to the original service data based on a pre-configured data processing procedure and a pre-configured transmission parameter, where the data transmission coordination control information includes an amount of data after the original service data is processed or time information for the processed original service data to arrive at a wireless protocol layer; and transmitting the data transmission coordination control information to the wireless protocol layer, to trigger the wireless protocol layer to initiate an uplink transmission procedure for transmitting the processed original service data.

20 Claims, 6 Drawing Sheets

(56) References Cited

FOREIGN PATENT DOCUMENTS

| | | | | | |
|---|---|---|---|---|---|
| CN | 111586751 | A | | 8/2020 | |
| CN | 111586751 | B | * | 9/2023 | ........ H04W 28/0278 |

OTHER PUBLICATIONS

Huawei et al., "Pre-BSR Enabling Fast Scheduling", 3GPP TSG-RAN WG2 Meeting 103bis R2-1815504, Sep. 2018, 3 pages.

Alcatel-Lucent Shanghai Bell et al, "BSR and SR for Dual Connectivity", 3GPP TSG RAN WG2 Meeting #84 R2-134381, Nov. 2013, 3 pages.

* cited by examiner

METHOD AND APPARATUS FOR TRIGGERING UPLINK DATA TRANSMISSION ENHANCEMENT PROCEDURE, AND TERMINAL

CROSS-REFERENCE TO RELATED APPLICATIONS

This application is a continuation of International Application No. PCT/CN2022/071390, filed Jan. 11, 2022, which claims priority to Chinese Patent Application No. 202110038590.7, filed Jan. 12, 2021. The entire contents of each of the above-referenced applications are expressly incorporated herein by reference.

TECHNICAL FIELD

This application relates to the field of communications technologies, and in particular, relates to a method and apparatus for triggering an uplink data transmission enhancement procedure, and a terminal.

BACKGROUND

For uplink data transmission, a protocol layer on a User Equipment (UE) side includes a protocol in an application layer and a wireless transmission protocol. The transmission protocol in the application layer varies based on different applications. Typical protocols include a Transfer Control Protocol (TCP)/internet protocol (IP), a data encryption protocol, and a data compression protocol. The application layer compresses, encrypts, and packs data according to these protocols, and then transmits the data to a wireless protocol layer. A Service Data Adaptation Protocol (SDAP) sublayer of the wireless protocol layer maps the data to a radio bearer, that is, a corresponding bearer in packet data convergence protocol (PDCP)/Radio Link Control (RLC) sublayers. If currently there is no available uplink transmission license, a Medium Access Control (MAC) layer triggers a Scheduling Request (SR) and/or a Buffer Status Report (BSR) program to request a base station for uplink time-frequency resources and start uplink data transmission.

In a related technology, for uplink data transmission, data is processed in series in the application layer and the wireless protocol layer according to current layering of protocols. To be specific, after processing (for example, encrypting, compressing, and packing) original data, the application layer transmits the processed data to the wireless protocol layer, and then the wireless protocol layer starts an uplink data transmission procedure, for example, a data transmission process based on an SR/BSR program. A total delay of the uplink transmission is a sum of a processing delay of the application layer and a processing and transmission delay of the wireless protocol layer. For a delay-sensitive service with a large amount of data, processing of the application layer takes relatively long time, causing a relatively long delay of uplink data transmission.

SUMMARY

The embodiments of this application provide a method and apparatus for triggering an uplink data transmission enhancement procedure, and a terminal.

A first aspect provides a method for triggering an uplink data transmission enhancement procedure, including: generating, by an application layer of a terminal, original service data; estimating data transmission coordination control information corresponding to the original service data based on a pre-configured data processing procedure and a pre-configured transmission parameter, where the data transmission coordination control information includes an amount of data after the original service data is processed and/or information about time for the processed original service data to arrive at a wireless protocol layer; and transmitting the data transmission coordination control information to the wireless protocol layer, to trigger the wireless protocol layer to initiate an uplink transmission procedure for transmitting the processed original service data.

A second aspect provides an apparatus for triggering an uplink data transmission enhancement procedure, including: a generation module, configured to generate, by an application layer of a terminal, original service data; an estimation module, configured to estimate data transmission coordination control information corresponding to the original service data based on a pre-configured data processing procedure and a pre-configured transmission parameter, where the data transmission coordination control information includes an amount of data after the original service data is processed and/or information about time for the processed original service data to arrive at a wireless protocol layer; and a first transmitting module, configured to transmit the data transmission coordination control information to the wireless protocol layer, to trigger the wireless protocol layer to initiate an uplink transmission procedure for transmitting the processed original service data.

A third aspect provides a method for triggering an uplink data transmission enhancement procedure, including: receiving, by a wireless protocol layer of a terminal, data transmission coordination control information transmitted from an application layer, where the data transmission coordination control information includes an amount of data after the original service data is processed and/or information about time for the processed original service data to arrive at a wireless protocol layer; and starting, by the wireless protocol layer based on the data transmission coordination control information, an uplink transmission procedure for transmitting the processed original service data.

A fourth aspect provides an apparatus for triggering an uplink data transmission enhancement procedure, including: a second receiving module, configured to receive data transmission coordination control information transmitted from an application layer, where the data transmission coordination control information includes an amount of data after the original service data is processed and/or information about time for the processed original service data to arrive at a wireless protocol layer; and a starting module, configured to initiate, based on the data transmission coordination control information, an uplink transmission procedure for transmitting the processed original service data.

A fifth aspect provides a terminal. The terminal includes a processor, a memory, and a program or an instruction that is stored in the memory and that can be run on the processor, where when the program or the instruction is executed by the processor, the steps in the method according to the first aspect or the steps in the method according to the third aspect are implemented.

A sixth aspect provides a readable storage medium. The readable storage medium stores a program or an instruction, and when the program or the instruction is executed by a processor, the steps in the method according to the first aspect or the steps in the method according to the third aspect are implemented.

A seventh aspect provides a chip. The chip includes a processor and a communications interface, the communications interface is coupled to the processor, and the processor is configured to run a program or an instruction of a terminal, to implement the steps in the method according to the first aspect or the steps in the method according to the third aspect.

An eighth aspect provides a computer program product. The computer program product includes a processor, a memory, and a program or an instruction stored in the memory and executable on the processor, where when the program or the instruction is executed by the processor, the steps in the method according to the first aspect or the steps in the method according to the third aspect are implemented.

In the embodiments of this application, after the application layer of the terminal generates the original service data, the data transmission coordination control information corresponding to the original service data is estimated based on the pre-configured data processing procedure and the pre-configured transmission parameter. The data transmission coordination control information includes the amount of data after the original service data is processed and/or the information about time for the processed original service data to arrive at the wireless protocol layer. The data transmission coordination control information is transmitted to the wireless protocol layer of the terminal, to trigger the wireless protocol layer to initiate the uplink transmission procedure for transmitting the processed original service data. In this way, the wireless protocol layer can initiate the uplink transmission procedure before processing on the original service data is completed, so that a delay of uplink data transmission is shortened.

DETAILED DESCRIPTION

The following describes the technical solutions in the embodiments of this application in conjunction with the accompanying drawings in the embodiments of this application. Clearly, the described embodiments are some but not all of the embodiments of this application. All other embodiments obtained by a person of ordinary skill in the art based on the embodiments of this application shall fall within the protection scope of this application.

The terms "first", "second", and the like in the description and the claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It should be noted that the technology described in the embodiments of this application is not limited to a Long Time Evolution (LTE)/LTE-advanced (LTE-A) system, and may also be used in various wireless communications systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The described technologies can be applied to both the systems and the radio technologies mentioned above as well as to other systems and radio technologies. A New Radio (NR) system is described below as an example, and the term, NR, is used in most of the descriptions, but these technologies can also be used in an application other than an application of the NR system, for example, a 6$^{th}$ Generation (6G) communications system.

Figure 1:
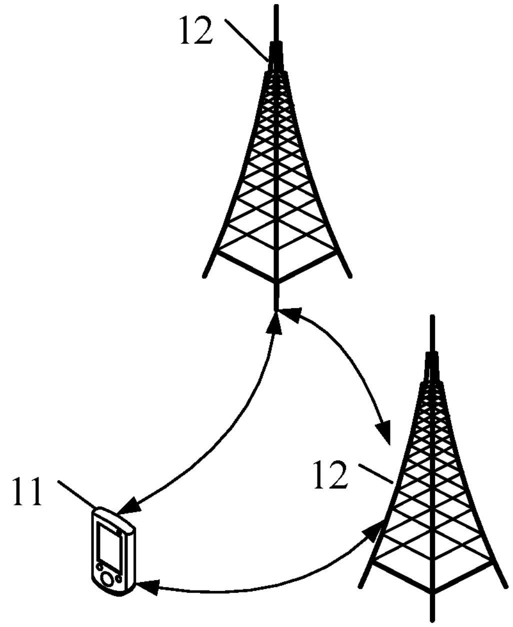
FIG. 1 is a schematic diagram of a wireless communications system to which an embodiment of this application can be applied.

FIG. 1 is a schematic diagram of a wireless communications system to which an embodiment of this application can be applied. The wireless communications system includes a terminal 11 and a network side device 12. The terminal 11 may also be referred to as a terminal device or User Equipment (UE). The terminal 11 may be a terminal side device such as a mobile phone, a tablet personal computer, a laptop computer or a notebook computer, a Personal Digital Assistant (PDA), a palmtop computer, a netbook, an ultra-mobile personal computer (UMPC), a Mobile Internet Device (MID), a wearable device, vehicle user equipment (VUE), or pedestrian user equipment (PUE). The wearable device includes a bracelet, a headset, glasses, and the like. It should be noted that a specific type of the terminal 11 is not limited in this embodiment of this application. The network side device 12 may be a base station or a core network device. The base station may be referred to as a Node B, an evolved Node B, an access point, a Base Transceiver Station (BTS), a radio base station, a radio transceiver, a Basic Service Set (BSS), an Extended Service Set (ESS), a Node B, an evolved Node B (eNB), a home Node B, a home evolved Node B, a Wireless Local Area Network (WLAN) access point, a Wireless Fidelity (Wi-Fi) node, a Transmitting Receiving Point (TRP), or another specific appropriate term in the art, provided that the same technical effects are achieved, the base station is not limited to specific technical vocabulary. It should be noted that in the embodiments of this application, a base station in the NR system is merely used as an example, but does not limit a specific type of the base station.

In conjunction with the accompanying drawings, the solutions provided in the embodiments of this application are described below in detail with specific embodiments and application scenarios.

Figure 2:
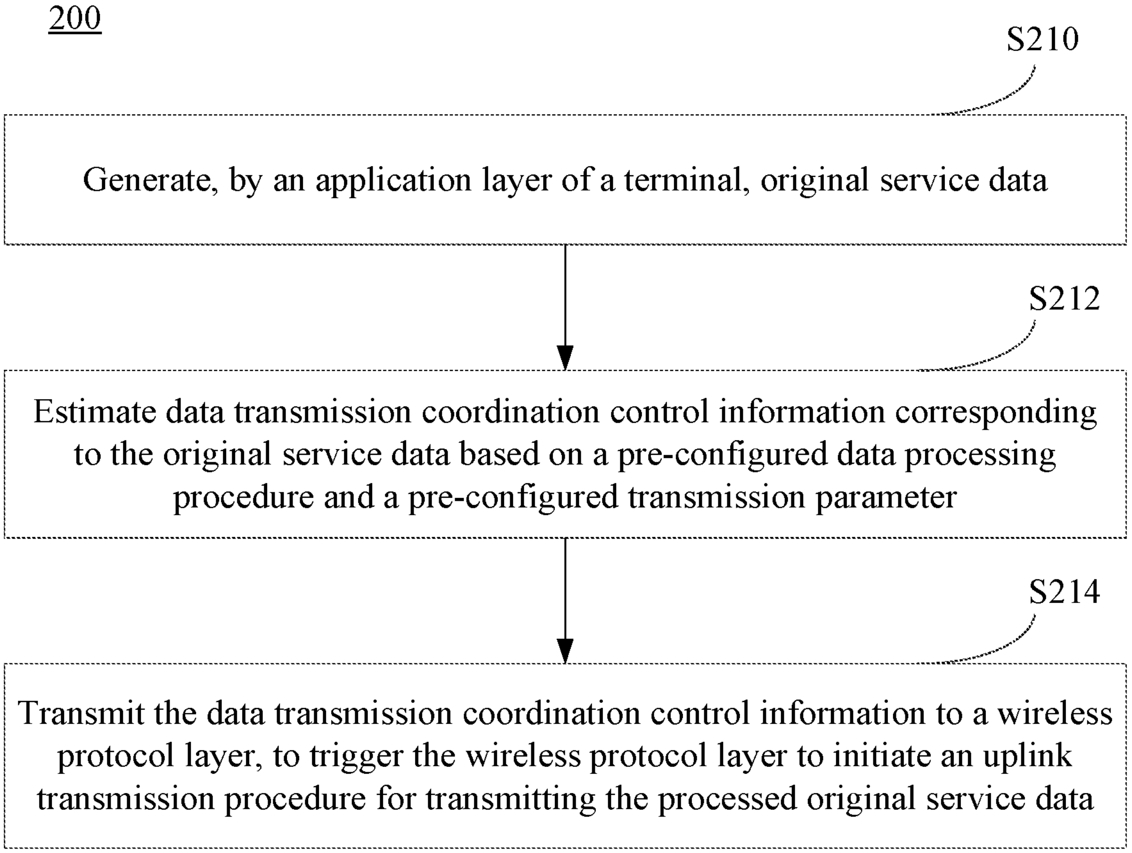
FIG. 2 is a flowchart of a method for triggering an uplink data transmission enhancement procedure according to an embodiment of this application.

FIG. 2 is a schematic flowchart of a method for triggering an uplink data transmission enhancement procedure according to an embodiment of this application. The method 200 may be performed by an application layer of a terminal. In other words, the method may be performed by software installed on the terminal. As shown in FIG. 2, the method may include the following steps:

S210: Generate, by an application layer of a terminal, original service data.

In a specific application, the application layer of the terminal may generate the original service data when executing a service. For example, a user uses an application, for example, an instant messaging application, installed on the terminal to generate voice data.

S212: Estimate data transmission coordination control information corresponding to the original service data based on a pre-configured data processing procedure and a pre-configured transmission parameter, where the data transmission coordination control information includes an amount of data after the original service data is processed and/or information about time for the processed original service data to arrive at a wireless protocol layer.

In this embodiment of this application, different applications may correspond to different pre-configured data processing procedures, that is, different applications may correspond to different data processing configurations. In some embodiments, the data processing procedure may include, but is not limited to, encryption, compressing, and packaging. The application layer may estimate, based on the pre-configured data processing procedure, time for processing the original service data and the amount of the processed data.

In this embodiment of this application, the transmission parameter may include a pre-configured time sequence of frames, transmission rate, and the like during transmission of the data to the wireless protocol layer. The application layer may estimate time for transmitting the processed data from the application layer to the wireless protocol layer. The application layer may estimate, based on the time for processing and the time for transmitting, the information about time for the processed original service data to arrive at the wireless protocol layer.

In this embodiment of the present application, the application layer mentioned above may be a specific protocol layer or functional module of an application installed on a wireless terminal, or may be an adaptation layer and a functional module, in an operating system on a wireless terminal, for data transmission between an upper-layer application and a modem module. In the descriptions of this embodiment of this application, for the purpose of convenience, the term "application layer" is used for description.

Because clocks may be different among wireless protocol layers, to avoid ambiguity, in some implementations, the time information may be used to indicate a time length between an arrival moment of the processed original service data and a current moment. In other words, the time information may indicate how long it takes for the data to arrive at the wireless protocol layer.

In some implementations, the time information may indicate time in a time system of the wireless protocol layer, or may indicate time in a time system of a wireless communications system. For example, a mapping relationship between time of the application layer and time of the wireless protocol layer may be established in the application layer, and the obtained time for the processed original service data to arrive at the wireless protocol layer is converted from time of the application layer to the time of the wireless protocol layer, so that the obtained time information is the time in the time system of the wireless protocol layer. In some embodiments, the application layer may convert the time into the time in the time system of the wireless communications system. For example, the time information that is transmitted is a clock identifier in a 5G system.

In some embodiments, the time information may be time in a time system of the application layer. After receiving the time information, the wireless protocol layer converts time indicated by the time information into the time in the time system of the wireless protocol layer or the time in the time system of the wireless communications system.

In the foregoing implementations, the time in the time system of the wireless protocol layer may be identified by one of the following:

(1) a system frame number (SFN);

(2) a slot identifier (for example, a slot index) of a primary cell (PCell) of the terminal;

(3) a slot identifier (for example, slot index) of a primary secondary cell (PSCell) of the terminal; and (4) an Orthogonal frequency division multiplex (OFDM) symbol identifier (for example, symbol index).

In some implementations, there may be a delay deviation for the application layer to complete data processing. To obtain a more accurate estimated arrival time after processing, the time indicated by the time information is time obtained by a pre-specified delay variation based on time estimated based on the transmission parameter. In other words, the delay variation is taken into consideration when the application layer notifies the wireless protocol layer of estimated time at which the data arrives at the wireless protocol layer. The estimated arrival time for the notification is time obtained by average or maximum time variation based on the estimated time.

In some implementations, the data transmission coordination control information may further include a Quality of Service (QoS) flow identifier. In some implementations, the wireless protocol layer can learn about a QoS flow corresponding to the data transmission coordination control information, and therefore can initiate an uplink data transmission procedure for the QoS flow in advance.

In some implementations, if the original service data corresponds to a plurality of QoS flows, for each of the QoS flows, the data transmission coordination control information corresponding to the QoS flow is estimated. For example, for a real-time video service, H264 encoding may be used. A result is that one piece of video data is encoded into three types of frames: I-frames, P-frames, and B-frames. Each type of the frames may correspond to one QoS flow. The application layer may notify the wireless protocol layer of data transmission coordination control information corresponding to each type of the frames.

In some implementations, if a service corresponding to the original service data is a periodical service, the application layer may further notify the wireless protocol layer of a data transmission periodicity. In some implementations, the wireless protocol layer may obtain a periodicity of the periodical service, and therefore may trigger the uplink data transmission procedure based on the periodicity of the service according to timing advance, to reduce a delay of uplink transmission in the periodical service.

S214: Transmit the data transmission coordination control information to the wireless protocol layer, to trigger the wireless protocol layer to initiate an uplink transmission procedure for transmitting the processed original service data.

In this embodiment of this application, the application layer transmits the data transmission coordination control information to the wireless protocol layer, so that the wireless protocol layer can learn about the transmission time of uplink data that is about to arrive and/or the amount of data, and the wireless protocol layer can initiate the uplink transmission procedure with a network side device before the uplink data transmitted from the application layer arrives, for example, transmit a Scheduling Request (SR) to the network side device, and after an initial uplink transmission license is obtained from the network side device, transmit, by using the initial uplink transmission license, a Buffer Status Report (BSR) to the network side device. In this way, uplink wireless data transmission may be performed coordinately with the network side after the uplink data transmitted from the application layer arrives, to reduce a delay of uplink data transmission.

In some implementations, one data control module may be added to the application layer, and the data control module is configured to transmit data to and receive data from a lower layer. In some implementations, in S214, the data transmission coordination control information may be transmitted to the wireless protocol layer by using the data control module in the application layer.

In some implementations, the application layer needs to obtain information about whether the wireless protocol layer has a capability of initiating uplink data transmission based on the data transmission coordination control information in advance, to determine whether the wireless protocol layer supports interaction of the data transmission coordination control information with an upper-layer application (referred to as an uplink data transmission enhancement procedure in the embodiments of this application). In turn, the wireless protocol layer also needs to obtain information about whether the application layer supports estimation of the data transmission coordination control information corresponding to the original service data, and transmission of the data transmission coordination control information to the wireless protocol layer (this procedure is referred to as an uplink data transmission enhancement procedure in the embodiments of this application). Therefore, in some implementations, the method may further include one of the following:

(1) The application layer transmits registration information to a core network of the wireless communications system, where the registration information includes capability information, and the capability information indicates that an application corresponding to the application layer supports the uplink data transmission enhancement procedure. For example, an upper-layer application may register with a core network of a wireless network, and the registration information includes information about whether the application supports the uplink data transmission enhancement procedure (that is, supports estimation of the data transmission coordination control information corresponding to the original service data, and transmission of the data transmission coordination control information to the wireless protocol layer before processing on the original service data is completed). The core network may notify UE (that is, a wireless protocol layer of the UE) of the information about whether the application supports the uplink data transmission enhancement procedure.

(2) The application layer reads wireless device configuration information of the terminal, and determines, based on the configuration information, that the terminal supports the uplink data transmission enhancement procedure, that is, supports to initiate the uplink data transmission procedure with the network side device based on the data transmission coordination control information after the data transmission coordination control information is received and before the uplink data from the application layer arrives. For example, the upper-layer application that supports the uplink data transmission enhancement procedure may read wireless device configuration information of UE, for example, information about a software version or chip model of a modem, and determines, based on the read wireless device configuration information, whether the UE supports the uplink data transmission enhancement procedure.

(3) The application layer receives a function indication transmitted from the core network of the wireless communications system, where the function indication indicates that the terminal supports the uplink data transmission enhancement procedure. For example, the UE transmits a function report about whether the uplink data transmission enhancement procedure is supported to the core network of the wireless network for storage, and the core network notifies an application installed on the UE of information about whether the UE supports the uplink data transmission enhancement procedure. For example, the core network transmits an uplink data enhancement configuration to the application during installation, update, and/or UE application registration on the UE.

In some implementations, when that the UE (that is, the wireless protocol layer of the UE) supports the uplink data transmission enhancement procedure is determined, or when whether the UE supports the uplink data transmission enhancement procedure is not determined, the application layer may transmit a start request to the wireless protocol layer to request the wireless protocol layer to start the uplink data transmission enhancement procedure. For example, the start request is transmitted to the wireless protocol layer by using the foregoing data control module.

In some implementations, the wireless protocol layer receives the request for the uplink data transmission enhancement procedure, and a corresponding submodule in the wireless protocol layer may determine whether to agree to start the uplink data transmission enhancement procedure based on an RRC configuration, and transmit a response message. If the wireless protocol layer transmits information that it is agreed to start the uplink data transmission enhancement procedure, the uplink data transmission enhancement procedure is started successfully. The application layer may perform step S212 after the original service data is generated, to avoid an invalid uplink data transmission enhancement procedure performed by the application layer because the wireless protocol layer does not support the uplink data transmission enhancement procedure.

In this embodiment of this application, the application layer may start to process the original service data before, after, or during estimation of the data transmission coordination control information corresponding to the original service data, and transmits the processed service data to the wireless protocol layer after processing is completed. After receiving the processed service data, the wireless protocol layer may perform uplink wireless data transmission with the network side device after the network side device completes the SR and/or BSR procedures.

Figure 3:
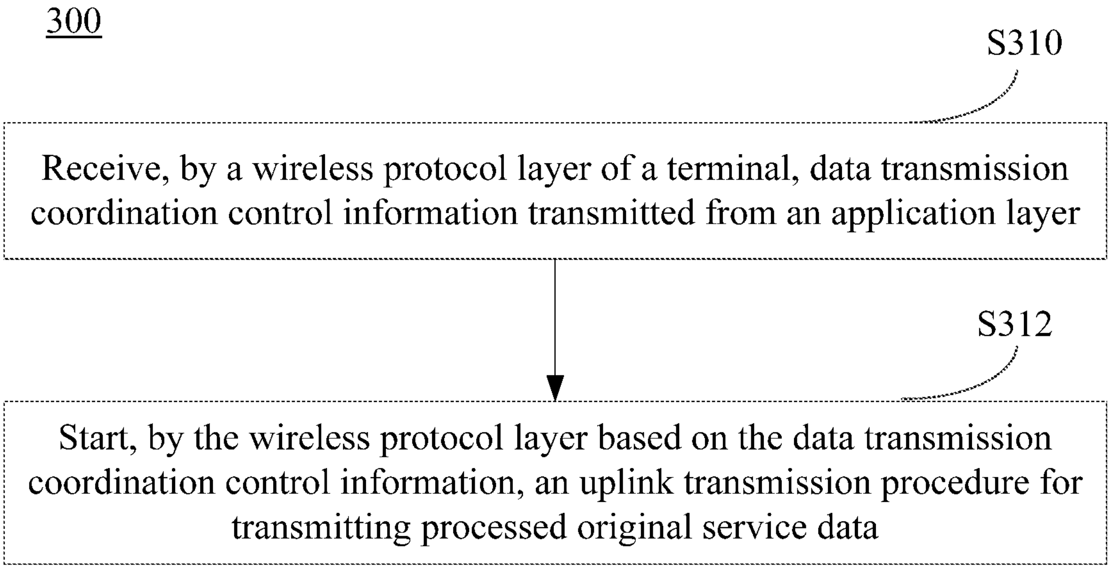
FIG. 3 is another flowchart of a method for triggering an uplink data transmission enhancement procedure according to an embodiment of this application.

FIG. 3 is another schematic flowchart of a method for triggering an uplink data transmission enhancement procedure according to an embodiment of this application. The method 300 may be performed by a wireless protocol layer of a terminal. In other words, the method may be performed by software and/or hardware installed on the terminal. As shown in FIG. 3, the method may include the following steps:

S310: A wireless protocol layer of a terminal receives data transmission coordination control information transmitted from an application layer, where the data transmission coordination control information includes an amount of data after the original service data is processed and/or information about time for the processed original service data to arrive at a wireless protocol layer.

In specific application, the application layer may transmit the data transmission coordination control information according to the method 200, and the data transmission coordination control information is the same as the data transmission coordination control information in the method 200. Details are not described herein again.

In specific application, one data control module may be added to a PDCP sublayer of the wireless protocol layer and be configured to process the data transmission coordination control information from the application layer. A SDAP sublayer may extend with one adaptation submodule configured to transmit the data transmission coordination control information from the application layer to a corresponding PDCP entity.

In some implementations, if the received time information is time in a time system of the application layer, after the data transmission coordination control information is received, the method may further include: converting the time information into time in a time system of the wireless protocol layer, or converting the time information into time in a time system of a wireless communications system. That is, to let the wireless protocol layer learn about time indicated by the time information, the wireless protocol layer may convert the time information into the time in the time system of the wireless communications system based on a mapping relationship between time of the application layer and time of the wireless protocol layer. In some embodiments, the wireless protocol layer may convert the time information into the time in the time system of the wireless communications system, for example, into a clock identifier in a 5G system.

For example, the application layer transmits the data transmission coordination control information to the wireless protocol layer, and a self-adaptive module in the SDAP sublayer of the wireless protocol layer may convert time of the application layer into time of the wireless protocol layer or the time in the time system of the wireless communications system, and transmit the converted time information to the corresponding PDCP sublayer.

S312: Start, by the wireless protocol layer based on the data transmission coordination control information, an uplink transmission procedure for transmitting the processed original service data.

In specific application, the uplink transmission procedure for transmitting the processed original service data started by the wireless protocol layer may include:

Step 1: Transmit, to a network side device based on the data transmission coordination control information, an SR before the processed original service data arrives.

Step 2: After an initial uplink transmission license transmitted by the network side device is received, transmit a BSR to the network side device by using the initial uplink transmission license, where the BSR is used for notifying the network side device that an amount of data to be transmitted is an amount of data after the original service data is processed.

In some implementations, after the wireless protocol layer of the terminal receives the data transmission coordination control information transmitted from the application layer, the method may further include: receiving the processed original service data transmitted from the application layer; and transmitting the processed original service data to the network side device after the BSR is transmitted to the network side device. In some implementations, the wireless protocol layer may receive the processed original service data before or after receiving the initial uplink transmission license transmitted by the network side device, or may receive the processed original service data after transmitting the BSR. This is not specifically limited in this embodiment of this application. In some implementations, the uplink data transmission procedure may be initiated before the processed original service data is received, to apply, in advance, to the network side device for a resource for transmitting uplink data, thereby reducing a delay.

In some implementations, if the data transmission coordination control information includes a QoS flow identifier, and if the wireless protocol layer receives the data transmission coordination control information that includes a plurality of different QoS flow identifiers, the wireless protocol layer may start one uplink data transmission procedure for the data transmission coordination control information corresponding to each of the QoS flow identifiers.

In some implementations, if the application layer has notified the wireless protocol layer of a periodicity of a service, the wireless protocol layer may start one uplink data transmission procedure in advance before each period comes.

In some implementations, before S310, the wireless protocol layer may further obtain information about whether the application layer supports the uplink data transmission enhancement procedure (that is, whether the application layer supports to transmit the data transmission coordination control information to the wireless protocol layer before processing on the original service data is completed), or notify the application layer of information about whether the wireless protocol layer supports the uplink data transmission enhancement procedure (that is, whether the wireless protocol layer supports to initiate the uplink data transmission procedure with the network side device after receiving the data transmission coordination control information). Therefore, before S310, the method may further include one of the following:

(1) receiving capability information transmitted by the network side device, where the capability information indicates that an application corresponding to the application layer supports the uplink data transmission enhancement procedure, where for example, an upper-layer application may register with a core network of a wireless network, and the registration information includes information about whether the application supports the uplink data transmission enhancement procedure. The core network notifies UE of the information about whether the application supports the uplink data transmission enhancement procedure.

(2) transmitting a function report to the network side device, where the function report indicates that the terminal supports the uplink data transmission enhancement procedure. For example, the UE transmits a function report about whether the uplink data transmission enhancement procedure is supported to the core network of the wireless network for storage, and the core network notifies an application installed on the UE of information about whether the UE supports the uplink data transmission enhancement procedure. For example, the core network transmits an uplink data enhancement configuration to the application during installation, update, and/or UE application registration on the UE.

In some implementations, the application layer may further transmit a start request to the wireless protocol layer to request the wireless protocol layer to start the uplink data transmission enhancement procedure. Therefore, in some implementation, before S310, the method may further include:

receiving a start request transmitted from the application layer, where the start request is used to request the wireless protocol layer to start the uplink data transmission enhancement procedure; and starting the uplink data transmission enhancement procedure.

In some implementations, the wireless protocol layer may start the uplink data transmission enhancement procedure when the application layer requests, to avoid non-corresponding processing of the application layer and the wireless protocol layer because the procedure is started in a case in which the application layer does not support the uplink data transmission enhancement procedure.

In some implementations, the wireless protocol layer may further return, to the application layer after the uplink data transmission enhancement procedure is started, a response message about starting the uplink data transmission enhancement procedure, so that the application layer can learn that the wireless protocol layer has started the uplink data transmission enhancement procedure. The wireless protocol layer may not return a response message, and the application layer considers, by default, that the wireless protocol layer has started the uplink data transmission enhancement procedure. For example, the application layer may transmit the start request if that the wireless protocol layer supports the uplink data transmission enhancement procedure is learned, and may agree, in advance, with the wireless protocol layer on starting the uplink data transmission enhancement procedure when the start request is received. In this case, the wireless protocol layer does not need to transmit the response message to the application layer.

It should be noted that, the method for triggering the uplink data transmission enhancement procedure provided in this embodiment of this application may be performed by an apparatus for triggering the uplink data transmission enhancement procedure or a control module that is in the apparatus for triggering the uplink data transmission enhancement procedure and that is configured to perform the method for triggering the uplink data transmission enhancement procedure. In the embodiments of this application, that the apparatus for triggering the uplink data transmission enhancement procedure performs the method for triggering the uplink data transmission enhancement procedure is used as an example to describe the apparatus for triggering the uplink data transmission enhancement procedure provided in the embodiments of this application.

Figure 4:
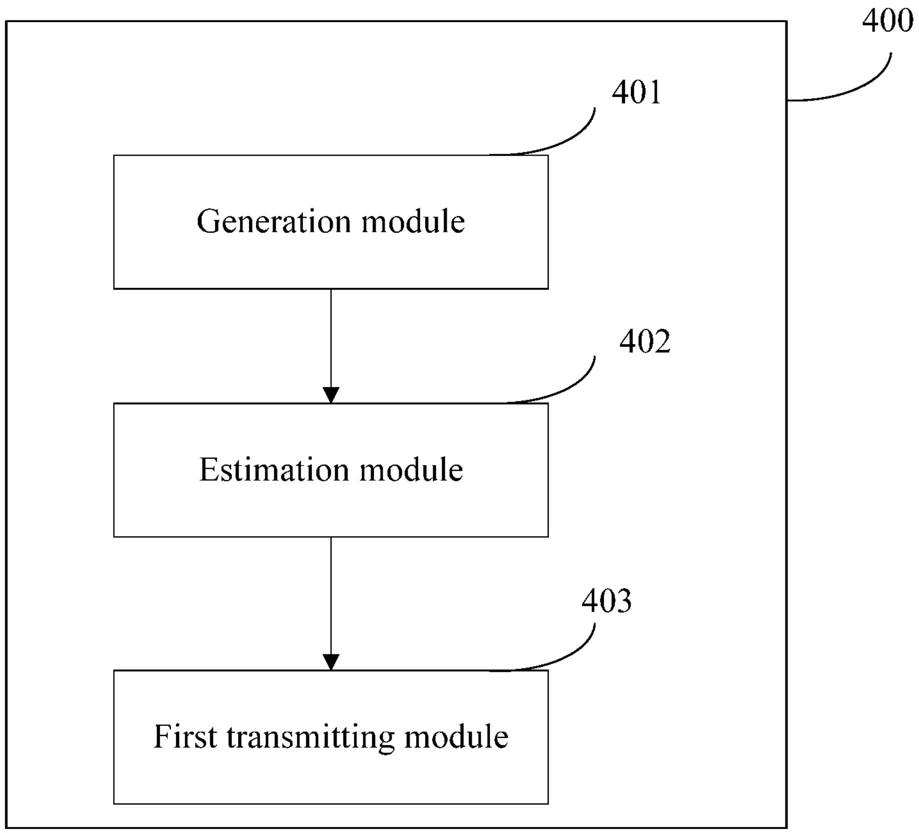
FIG. 4 is a schematic diagram of a structure of an apparatus for triggering an uplink data transmission enhancement procedure according to an embodiment of this application.

FIG. 4 is a schematic diagram of a structure of an apparatus for triggering an uplink data transmission enhancement procedure according to an embodiment of this application. As shown in FIG. 4, the apparatus 400 for triggering the uplink data transmission enhancement procedure mainly includes a generation module 401, an estimation module 402, and a first transmitting module 403.

In this embodiment of this application, the generation module 401 is configured to generate, by an application layer of a terminal, original service data; the estimation module 402 is configured to estimate data transmission coordination control information corresponding to the original service data based on a pre-configured data processing procedure and a pre-configured transmission parameter, where the data transmission coordination control information includes an amount of data after the original service data is processed and/or information about time for the processed original service data to arrive at a wireless protocol layer; and the first transmitting module 403 is configured to transmit the data transmission coordination control information to the wireless protocol layer, to trigger the wireless protocol layer to initiate an uplink transmission procedure for transmitting the processed original service data.

In some implementations, the time information is used to indicate a time length between an arrival moment of the processed original service data and a current moment.

In some implementations, the time information indicates time in a time system of the wireless protocol layer may indicate time in a time system of a wireless communications system.

In some implementations, the time in the time system of the wireless protocol layer is identified by one of the following:

an SFN a slot identifier of a primary cell;

a slot identifier of a primary secondary cell; and an OFDM symbol identifier.

In some implementations, time indicated by the time information is time obtained by a pre-specified delay variation based on time estimated based on the transmission parameter.

In some implementations, the data transmission coordination control information further includes a QoS flow identifier.

In some implementations, that the estimation module 402 estimates the data transmission coordination control information corresponding to the original service data based on the pre-configured data processing procedure and the pre-configured transmission parameter includes:

if the original service data corresponds to a plurality of QoS flows, for each of the QoS flows, estimating the data transmission coordination control information corresponding to the QoS flow.

In some implementations, the first transmitting module 403 is further configured to: if a service corresponding to the original service data is a periodical service, notify the wireless protocol layer of a data transmission periodicity.

In some implementations, that the first transmitting module 403 transmits the data transmission coordination control information to the wireless protocol layer includes: transmitting the data transmission coordination control information to the wireless protocol layer by using a data control module.

In some implementations, the apparatus further includes one of the following:

a second transmitting module, configured to: before the data transmission coordination control information corresponding to the original service data is estimated based on the pre-configured data processing procedure and the pre-configured transmission parameter, transmit registration information to a core network of the wireless communications system, where the registration information includes capability information, and the capability information indicates that the apparatus supports the uplink data transmission enhancement procedure;

a reading module, configured to: before the data transmission coordination control information corresponding to the original service data is estimated based on the pre-configured data processing procedure and the pre-configured transmission parameter, read wireless device configuration information of the terminal, and determine, based on the configuration information, that the terminal supports the uplink data transmission enhancement procedure; and a first receiving module, configured to: before the data transmission coordination control information corresponding to the original service data is estimated based on the pre-configured data processing procedure and the pre-configured transmission parameter, receive a function indication transmitted from the core network of the wireless communications system, where the function indication indicates that the terminal supports the uplink data transmission enhancement procedure.

In some implementations, the second transmitting module is further configured to transmit a start request to the wireless protocol layer to request the wireless protocol layer to start the uplink data transmission enhancement procedure.

The apparatus for triggering the uplink data transmission enhancement procedure provided in this embodiment of this application can implement the processes implemented in the method embodiment of FIG. 2, and achieve a same technical effect. To avoid repetition, details are not described herein again.

Figure 5:
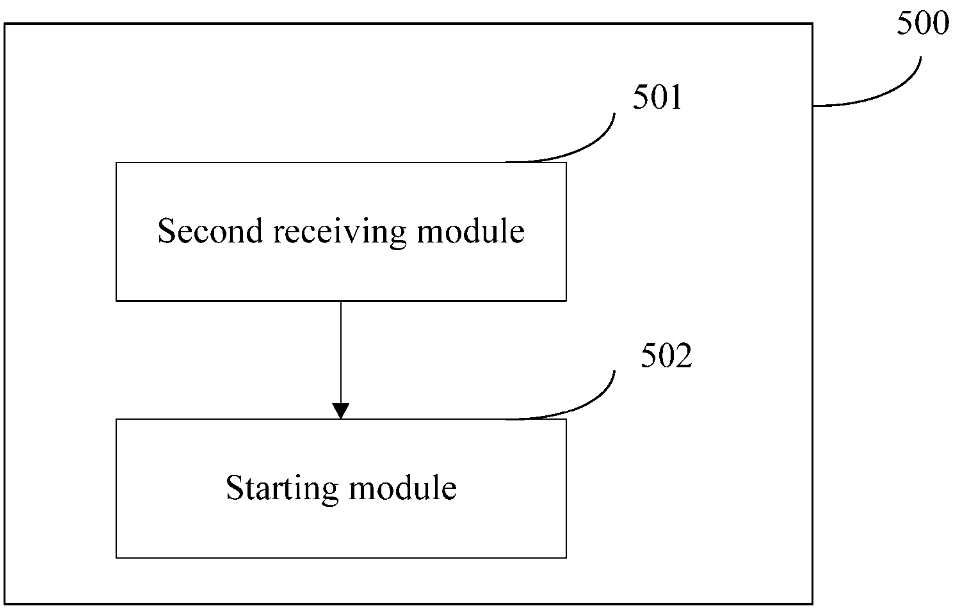
FIG. 5 is another schematic diagram of a structure of an apparatus for triggering an uplink data transmission enhancement procedure according to an embodiment of this application.

FIG. 5 is another schematic diagram of a structure of an apparatus for triggering an uplink data transmission enhancement procedure according to an embodiment of this application. As shown in FIG. 5, the apparatus 500 for triggering the uplink data transmission enhancement procedure mainly includes a second receiving module 501 and a starting module 502.

In this embodiment of this application, the second receiving module 501 is configured to receive data transmission coordination control information transmitted from an application layer, where the data transmission coordination control information includes an amount of data after the original service data is processed and/or information about time for the processed original service data to arrive at a wireless protocol layer; and the starting module 502 is configured to start, based on the data transmission coordination control information, an uplink transmission procedure for transmitting the processed original service data.

In some implementations, the time information is used to indicate a time length between an arrival moment of the processed original service data and a current moment.

In some implementations, the time information indicates time in a time system of the wireless protocol layer may indicate time in a time system of a wireless communications system.

In some implementations, the apparatus further includes a conversion module, configured to: convert the time information into time in a time system of the wireless protocol layer, or convert the time information into time in a time system of a wireless communications system.

In some implementations, the time in the time system of the wireless protocol layer is identified by one of the following:

an SFN a slot identifier of a primary cell;

a slot identifier of a primary secondary cell; and an OFDM symbol identifier.

In some implementations, that the starting module 502 starts, based on the data transmission coordination control information, the uplink transmission procedure for transmitting the processed original service data includes:

transmitting, to a network side device based on the data transmission coordination control information, a scheduling request SR before the processed original service data arrives; and after an initial uplink transmission license transmitted by the network side device is received, transmitting a buffer status report BSR to the network side device by using the initial uplink transmission license, where the BSR is used for notifying the network side device that an amount of data to be transmitted is an amount of data after the original service data is processed.

In some implementations, the second receiving module 501 is further configured to receive the processed original service data transmitted from the application layer; and the starting module 502 is further configured to transmit the processed original service data to the network side device after the BSR is transmitted to the network side device.

In some implementations, the apparatus further includes one of the following:

a third receiving module, configured to: before the data transmission coordination control information transmitted from the application layer is received in the wireless protocol layer of a terminal, receive capability information transmitted by the network side device, where the capability information indicates that an application corresponding to the application layer supports the uplink data transmission enhancement procedure; and a third transmitting module, configured to: before the data transmission coordination control information transmitted from the application layer is received in the wireless protocol layer of the terminal, transmit a function report to the network side device, where the function report indicates that the terminal supports the uplink data transmission enhancement procedure.

In some implementations, the third receiving module is further configured to receive a start request transmitted from the application layer, where the start request is used to request the wireless protocol layer to start the uplink data transmission enhancement procedure; and the starting module 502 is further configured to start the uplink data transmission enhancement procedure.

In some implementations, the second receiving module 501 includes:

a SDAP sublayer for receiving the data transmission coordination control information, and transmitting the data transmission coordination control information to a corresponding PDCP entity; and the PDCP entity for receiving the data transmission coordination control information transmitted from the SDAP sublayer.

The apparatus for triggering the uplink data transmission enhancement procedure in this embodiment of this application may be an apparatus, or may be a component, an integrated circuit, or a chip in a terminal. The apparatus may be a mobile terminal, or may be a non-mobile terminal. For example, the mobile device may include but is not limited to the types of the terminal 11 listed above, and the non-mobile terminal may be a server, a Network Attached Storage (NAS), a personal computer (PC), a television (TV), an automated teller machine, or a self-service machine. This is not specifically limited in the embodiments of this application.

The apparatus for triggering the uplink data transmission enhancement procedure in this embodiment of this application may be an apparatus with an operating system. The operating system may be an Android operating system, may be an iOS operating system, or may be another operating system. This is not specifically limited in this embodiment of this application.

The apparatus for triggering the uplink data transmission enhancement procedure provided in this embodiment of this application can implement the processes implemented in the method embodiment of FIG. 3, and achieve a same technical effect. To avoid repetition, details are not described herein again.

Figure 6:
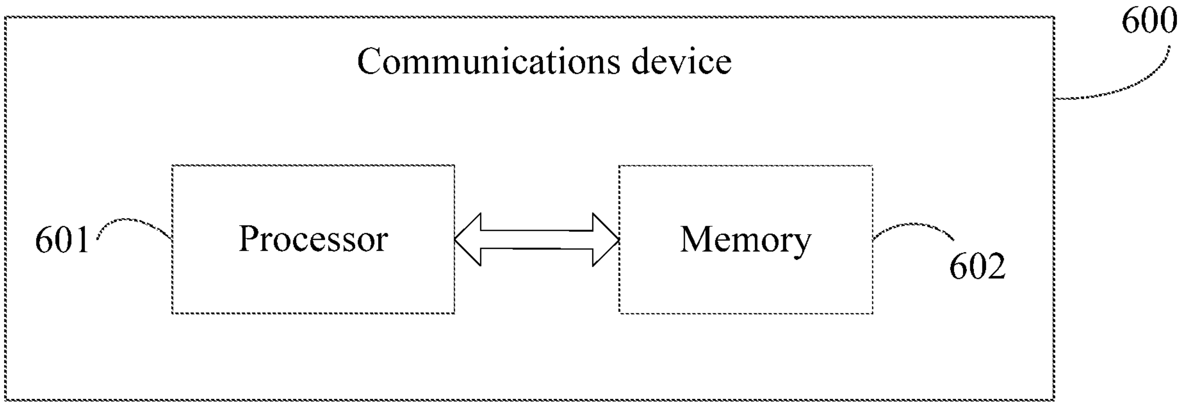
FIG. 6 is a schematic diagram of a structure of a communications device according to an embodiment of this application.

As shown in FIG. 6, an embodiment of this application further provides a communications device 600, including a processor 601, a memory 602, a program or an instruction that is stored in the memory 602 and that can run on the processor 601. For example, when the communications device 600 is a terminal, the program or the instruction is executed by the processor 601 to implement each process in the embodiments of the method for triggering the uplink data transmission enhancement procedure, and a same technical effect can be achieved. To avoid repetition, details are not described herein again.

Figure 7:
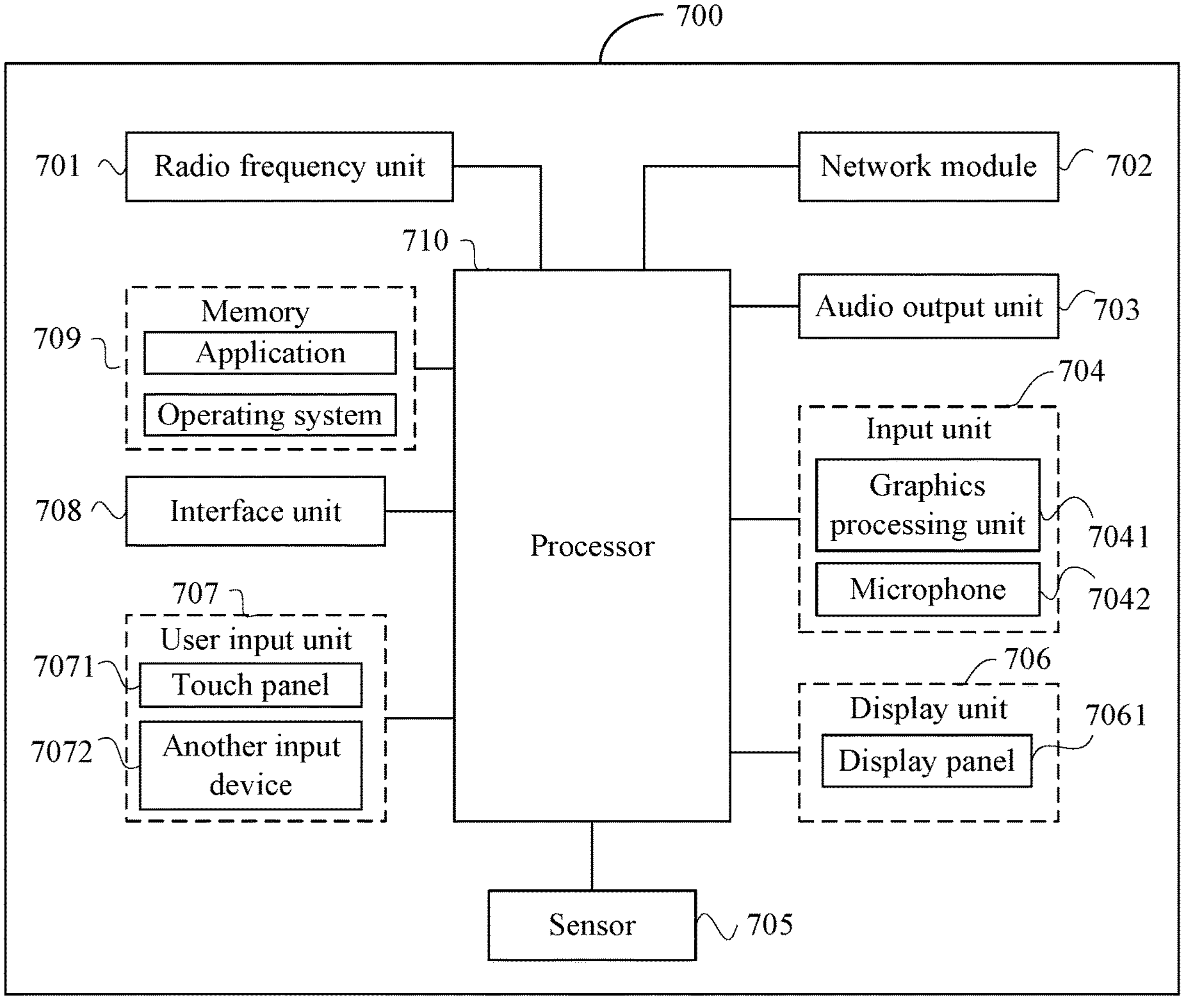
FIG. 7 is a schematic diagram of a hardware structure of a terminal according to an embodiment of this application.

FIG. 7 is a schematic diagram of a hardware structure of a terminal according to an embodiment of this application.

The terminal 700 includes, but is not limited to, components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (for example, a battery) that supplies power to each component. The power supply may be logically connected to the processor 710 by using a power supply management system, to implement functions such as charging and discharging management, and power consumption management by using the power supply management system. The terminal structure shown in FIG. 7 constitutes no limitation on the terminal, and the terminal may include more or fewer components than those shown in the figure, or combine some components, or have different component arrangements. Details are not described herein.

It should be understood that, in this embodiment of this application, the input unit 704 may include a Graphics Processing Unit (GPU) 7041 and a microphone 7042, and the graphics processing unit 7041 processes image data of a still picture or a video obtained by an image capture apparatus (for example, a camera) in a video capture mode or an image capture mode. The display unit 706 may include a display panel 7061, and the display panel 7061 may be configured in a form of a liquid crystal display, an organic light-emitting diode, or the like. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include, but is not limited to, one or more of a physical keyboard, a function key (such as a volume control key or an on/off key), a trackball, a mouse, a joystick, and the like. Details are not described herein again.

In this embodiment of this application, the radio frequency unit 701 receives downlink data from a network side device and transmits the downlink data to the processor 710 for processing; and further transmits uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 710 may include one or more processing units. In some embodiments, an application processor and a modem processor may be integrated into the processor 710. The application processor mainly processes an operating system, a user interface, an application, an instruction, or the like. The modem processor mainly processes wireless communications, for example, a baseband processor. It can be understood that, the modem processor may not be integrated into the processor 710.

The processor 710 is configured to: generate, by an application layer of a terminal, original service data; estimate data transmission coordination control information corresponding to the original service data based on a pre-configured data processing procedure and a pre-configured transmission parameter, where the data transmission coordination control information includes an amount of data after the original service data is processed and/or information about time for the processed original service data to arrive at a wireless protocol layer; and transmit the data transmission coordination control information to the wireless protocol layer, to trigger the wireless protocol layer to initiate an uplink transmission procedure for transmitting the processed original service data.

The processor 710 is configured to: receive data transmission coordination control information transmitted from an application layer, where the data transmission coordination control information includes an amount of data after the original service data is processed and/or information about time for the processed original service data to arrive at a wireless protocol layer; and start, based on the data transmission coordination control information, an uplink transmission procedure for transmitting the processed original service data.

According to the terminal in the embodiments of this application, after the application layer of the terminal generates the original service data, the data transmission coordination control information corresponding to the original service data is estimated based on the pre-configured data processing procedure and the pre-configured transmission parameter. The data transmission coordination control information includes the amount of data after the original service data is processed and/or the information about time for the processed original service data to arrive at the wireless protocol layer. The data transmission coordination control information is transmitted to the wireless protocol layer of the terminal, to trigger the wireless protocol layer to initiate the uplink transmission procedure for transmitting the processed original service data. In this way, the wireless protocol layer can initiate the uplink transmission procedure before processing on the original service data is completed, so that a delay of uplink data transmission is shortened.

An embodiment of this application further provides a readable storage medium, where the readable storage medium stores a program or an instruction, and when the program or the instruction is executed by a processor, the processes of the foregoing embodiments of the method for triggering the uplink data transmission enhancement procedure are implemented, with the same technical effect achieved. To avoid repetition, details are not described herein again.

The processor is a processor in the terminal in the foregoing embodiments. The readable storage medium includes a computer-readable storage medium, for example, a computer Read-only Memory (ROM), a Random Access Memory (RAM), a magnetic disk or an optical disc, and the like.

An embodiment of this application further provides a chip. The chip includes a processor and a communications interface, the communications interface is coupled to the processor, and the processor is configured to run a program or an instruction of a network side device to implement the processes of the foregoing embodiments of the method for triggering the uplink data transmission enhancement procedure, with the same technical effect achieved. To avoid repetition, details are not described herein again.

A computer program product is provided. The computer program product includes a processor, a memory, and a program or an instruction stored in the memory and executable on the processor, where when the program or the instruction is executed by the processor, the processes of the foregoing embodiments of the method for triggering the uplink data transmission enhancement procedure are implemented, with the same technical effect achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any other variant thereof are intended to cover a non-exclusive inclusion, so that a process, a method, an article, or an apparatus that includes a list of elements not only includes those elements but also includes other elements which are not expressly listed, or further includes elements inherent to such a process, method, article, or apparatus. An element limited by "include/include a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. Based on such an understanding, the technical solutions of this application essentially or the part contributing to the prior art may be implemented in the form of a software product. The computer software product is stored in a storage medium (such as a ROM/RAM, a magnetic disk, or an optical disc) and includes several instructions for instructing a terminal (which may be a mobile phone, a computer, a server, or a network device) to execute the methods described in the embodiments of this application.

The embodiments of this application are described above in conjunction with the accompanying drawings, but this application is not limited to the above specific implementations, and the above specific implementations are only illustrative and not restrictive. Enlightened by this application, a person of ordinary skill in the art can make many forms without departing from the purpose of this application and the protection scope of the claims, all of which shall fall within the protection of this application.

What is claimed is:

1. A method for triggering an uplink data transmission enhancement procedure, comprising:

generating, by an application layer of a terminal, original service data;

estimating data transmission coordination control information corresponding to the original service data based on a pre-configured data processing procedure and a pre-configured transmission parameter, wherein the data transmission coordination control information comprises an amount of data after the original service data is processed or time information for the processed original service data to arrive at a wireless protocol layer; and transmitting the data transmission coordination control information to the wireless protocol layer, to trigger the wireless protocol layer to initiate an uplink transmission procedure for transmitting the processed original service data.

2. The method according to claim 1, wherein:

the time information is used to indicate a time length between an arrival moment of the processed original service data and a current moment;

the time information indicates time in a time system of the wireless protocol layer, or indicates time in a time system of a wireless communications system; or time indicated by the time information is time obtained by a pre-specified delay variation based on time estimated based on the transmission parameter.

3. The method according to claim 2, wherein the time in the time system of the wireless protocol layer is identified by one of the following:

a system frame number (SFN);

a slot identifier of a primary cell;

a slot identifier of a primary secondary cell; or an orthogonal frequency-division multiplexing OFDM symbol identifier.

4. The method according to claim 1, wherein the data transmission coordination control information further comprises a quality of service (QoS) flow identifier.

5. The method according to claim 4, wherein estimating the data transmission coordination control information corresponding to the original service data based on the pre-configured data processing procedure and the pre-configured transmission parameter comprises:

when the original service data corresponds to a plurality of QoS flows, for each of the QoS flows, estimating the data transmission coordination control information corresponding to the QoS flow.

6. The method according to claim 1, further comprising: when a service corresponding to the original service data is a periodical service, notifying the wireless protocol layer of a data transmission periodicity.

7. The method according to claim 1, wherein transmitting the data transmission coordination control information to the wireless protocol layer comprises:

transmitting the data transmission coordination control information to the wireless protocol layer by using a data control module in the application layer.

8. The method according to claim 1, wherein before estimating the data transmission coordination control information corresponding to the original service data based on the pre-configured data processing procedure and the pre-configured transmission parameter, the method further comprises one of the following:

transmitting registration information to a core network of the wireless communications system, wherein the registration information comprises capability information, and the capability information indicates that an application corresponding to the application layer supports the uplink data transmission enhancement procedure;

reading wireless device configuration information of the terminal, and determining, based on the configuration information, that the terminal supports the uplink data transmission enhancement procedure; or receiving a function indication transmitted from the core network of the wireless communications system, wherein the function indication indicates that the terminal supports the uplink data transmission enhancement procedure.

9. The method according to claim 8, wherein before estimating the data transmission coordination control information corresponding to the original service data based on the pre-configured data processing procedure and the pre-configured transmission parameter, the method further comprises:

transmitting a start request to the wireless protocol layer to request the wireless protocol layer to start the uplink data transmission enhancement procedure.

10. A method for triggering an uplink data transmission enhancement procedure, comprising:

receiving, by a wireless protocol layer of a terminal, data transmission coordination control information transmitted from an application layer, wherein the data transmission coordination control information comprises an amount of data after the original service data is processed or time information for the processed original service data to arrive at a wireless protocol layer; and starting, by the wireless protocol layer based on the data transmission coordination control information, an uplink transmission procedure for transmitting the processed original service data.

11. The method according to claim 10, wherein:

the time information is used to indicate a time length between an arrival moment of the processed original service data and a current moment; or the time information indicates time in a time system of the wireless protocol layer, or indicates time in a time system of a wireless communications system.

12. The method according to claim 10, wherein after receiving, by the wireless protocol layer of the terminal, the data transmission coordination control information transmitted from the application layer, the method further comprises:

converting the time information into time in a time system of the wireless protocol layer, or converting the time information into time in a time system of a wireless communications system.

13. The method according to claim 11, wherein the time in the time system of the wireless protocol layer is identified by one of the following:

a system frame number (SFN);

a slot identifier of a primary cell;

a slot identifier of a primary secondary cell; or an orthogonal frequency-division multiplexing OFDM symbol identifier.

14. The method according to claim 10, wherein starting, by the wireless protocol layer based on the data transmission coordination control information, the uplink transmission procedure for transmitting the processed original service data comprises:

transmitting, to a network side device based on the data transmission coordination control information, a scheduling request (SR) before the processed original service data arrives; and after an initial uplink transmission license transmitted by the network side device is received, transmitting a buffer status report (BSR) to the network side device by using the initial uplink transmission license, wherein the BSR is used for notifying the network side device that an amount of data to be transmitted is an amount of data after the original service data is processed.

15. The method according to claim 14, wherein after receiving, by the wireless protocol layer of the terminal, the data transmission coordination control information transmitted from the application layer, the method further comprises:

receiving the processed original service data transmitted from the application layer; and transmitting the processed original service data to the network side device after the BSR is transmitted to the network side device.

16. The method according to claim 10, wherein before receiving, by the wireless protocol layer of the terminal, the data transmission coordination control information transmitted from the application layer, the method further comprises one of the following:

receiving capability information transmitted by the network side device, wherein the capability information indicates that an application corresponding to the application layer supports the uplink data transmission enhancement procedure; or transmitting a function report to the network side device, wherein the function report indicates that the terminal supports the uplink data transmission enhancement procedure.

17. The method according to claim 16, wherein before receiving, by the wireless protocol layer of the terminal, the data transmission coordination control information transmitted from the application layer, the method further comprises:

receiving a start request transmitted from the application layer, wherein the start request is used to request the wireless protocol layer to start the uplink data transmission enhancement procedure; and starting the uplink data transmission enhancement procedure.

18. The method according to claim 10, wherein receiving, by the wireless protocol layer of the terminal, the data transmission coordination control information transmitted from the application layer comprises:

receiving, in a service data adaptation protocol (SDAP) sublayer of the terminal, the data transmission coordination control information, and transmitting the data transmission coordination control information to a corresponding packet data convergence protocol (PDCP) entity.

19. A terminal, comprising:

a memory storing a computer program; and a processor coupled to the memory and configured to execute the computer program to perform operations comprising:

generating, by an application layer of a terminal, original service data;

estimating data transmission coordination control information corresponding to the original service data based on a pre-configured data processing procedure and a pre-configured transmission parameter, wherein the data transmission coordination control information comprises an amount of data after the original service data is processed or time information for the processed original service data to arrive at a wireless protocol layer; and transmitting the data transmission coordination control information to the wireless protocol layer, to trigger the wireless protocol layer to initiate an uplink transmission procedure for transmitting the processed original service data.

20. A non-transitory computer-readable storage medium, storing a computer program, when the computer program is executed by a processor of a terminal, causes the processor to perform the method according to claim 1.

* * * * *